W. S. MILLER.
SHOCK ABSORBER.
APPLICATION FILED JULY 21, 1914.
1,171,132.
Patented Feb. 8, 1916.
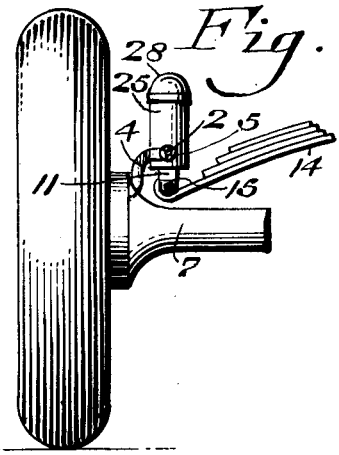
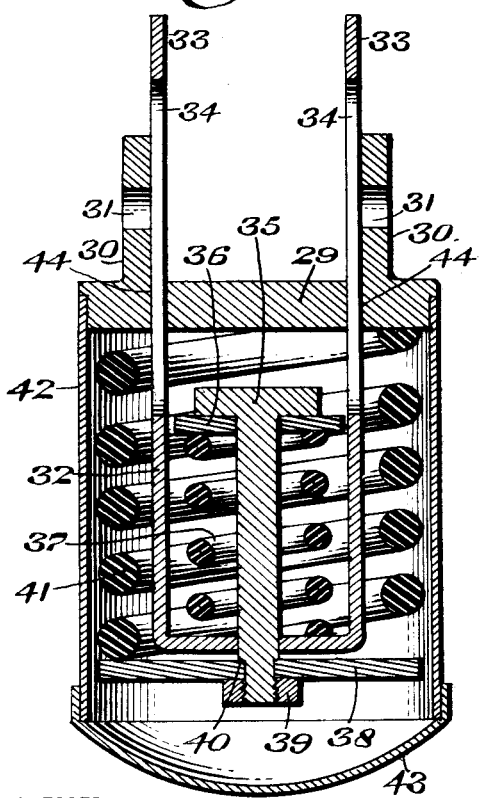
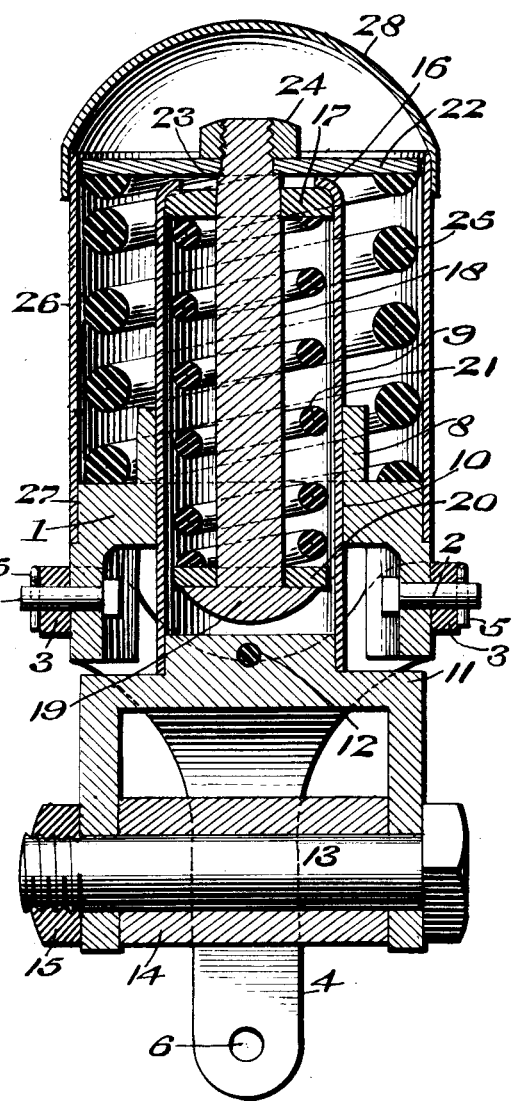
WITNESSES
P. F. Nagle.
H. C. Dieterich
INVENTOR
William S. Miller.
BY Hedersheim Fairbanks
ATTORNEYS

UNITED STATES PATENT OFFICE.

WILLIAM S. MILLER, OF PHILADELPHIA, PENNSYLVANIA, ASSIGNOR TO UTILITY SHOCK ABSORBER COMPANY, OF PHILADELPHIA, PENNSYLVANIA, A CORPORATION OF PENNSYLVANIA.

SHOCK-ABSORBER.

1,171,132.     Specification of Letters Patent.     Patented Feb. 8, 1916.

Application filed July 21, 1914. Serial No. 852,206.

*To all whom it may concern:*

Be it known that I, WILLIAM S. MILLER, a citizen of the United States, residing in the city and county of Philadelphia, State of Pennsylvania, have invented a new and useful Shock-Absorber, of which the following is a specification.

My invention consists of a novel shock absorber which is adapted to be employed in conjunction with any desired type of vehicle or other mechanism, and which is especially adapted to be employed in conjunction with automobiles.

It further consists of a novel shock absorber which is mounted in such a manner as to permit the oscillation thereof, and wherein the load on the elastic cushion of the shock absorber is exerted in substantially the axial line of said cushion.

It further consists of a novel shock absorber, wherein a plurality of springs are employed, which coöperate in a novel manner to absorb and equalize the shocks.

It further consists of other novel features of construction, all as will be hereinafter fully set forth.

For the purpose of illustrating my invention, I have shown in the accompanying drawings, forms thereof which are at present preferred by me, since the same will give in practice, satisfactory and reliable results, although it is to be understood that the various instrumentalities of which my invention consists can be variously arranged and organized and that my invention is not limited to the precise arrangement and organization of these instrumentalities as herein shown and described.

Figure 1 represents an elevation of a portion of a vehicle, having a shock absorber embodying my invention, in assembled position with respect thereto. Fig. 2 represents a sectional elevation of my device. Fig. 3 represents a sectional elevation of another embodiment of my invention.

Similar numerals of reference indicate corresponding parts in the figures.

Referring to the drawings:—Referring first to Figs. 1 and 2, 1 designates a base or body portion, through which pass the bolts 2, which latter also pass through the arms 3 of the shackle 4, and are maintained in the proper position with respect thereto by means of the cotter pins 5 or equivalent fastening devices. The shackle 4 is provided with an aperture 6 therethrough, whereby it may be readily attached to the axle housing 7, see Fig. 1. The body portion 1 is provided with an upwardly extending sleeve 8, whereby an extended bearing is formed for an inner shell or movable member 9, which latter is adapted to slide in the sleeve 8 and the aperture 10 in the body portion 1. The lower end of the inner shell 9 is connected in any desired manner to a yoke 11, and in the present instance, this is accomplished by means of a pin 12. The arms of the yoke 11 are adapted to receive a bolt 13, which latter passes through or is secured to the end of the spring 14, which latter is seated between the arms of the yoke 11, and said bolt is maintained in assembled position by means of a nut 15. The upper end of the inner shell 9 is inwardly deflected as at 16, thereby forming an abutment for a washer 17, which latter forms a spring abutment, and is slidably mounted on the bolt 18, which latter is provided with a head 19, above which is located a washer 20. 21 designates a spring interposed between the washer 17 and the washer 20, said spring, in the present instance, encircling the bolt 18. The free end of the bolt 18 passes through a washer or plate 22, which forms a spring abutment, and is provided with a shoulder 23 on one side of said washer, and a nut 24, which engages with the threaded end of the bolt 18, which extends through said washer 22. 25 designates a spring interposed between the body portion 1 and the top washer 22. 26 designates an outer shell, the lower end of which is connected in any desired manner to the body portion 1, which latter is of reduced diameter at its upper portion, as indicated at 27, in order that the outer face of the outer shell 26 will be substantially flush with the outer face of the body portion 1. 28 designates a dome, which is secured to or forms a part of the outer shell 26.

In the embodiment seen in Fig. 3, the fundamental principle is the same, but the device is shown in reversed position. In this embodiment, 29 designates a base or body portion having upwardly extending arms 30, which are apertured, as at 31, in order to receive the fastening devices for securing the body portion in assembled position. 32 designates an inner shell having the upwardly extending arms 33, which are slotted as at 34, in order to receive the fastening devices. 35 designates a bolt having a washer or abutment 36 thereon, between which and the bottom of the inner shell is interposed a spring 37. The bolt 35 passes through the lower end of the inner shell 32, so that the latter is slidable thereon, and the lower end of said bolt 35 is fixed with respect to a bottom washer 38 by means of a nut 39, which holds the washer against a shoulder 40 on said bolt 35. 41 designates a spring interposed between the body portion 29 and the bottom washer 38. 42 designates an outer shell, which is secured to the body portion 29 in any desired manner. 43 designates a dome which is secured to the lower portion of the outer shell 42 in any desired manner. The body portion 29 is apertured, as at 44, in order to permit the relative movement of the arm 33 and the body portion 29. The base portion 1 and the yoke 11 form hangers or supporting brackets.

The operation of my novel shock absorber will now be readily apparent to those skilled in the art to which my invention appertains, and is as follows: Referring first to the embodiment seen in Figs. 1 and 2, it is to be understood from the drawing that the outer spring 25 is of a greater strength than the inner spring 21, so that the springs travel in a different ratio to each other, and I have found in practice that by constructing the springs of such capacity that the ratio will be substantially two to one, that very advantageous results can be obtained. It will be seen that under load, the spring 14 is extended and owing to the manner of supporting the base portion 1 of the shock absorber, the pull or stress on the spring will always be in substantially the axial alinement of the springs. It will be seen that the inner shell 9 will slide downwardly against the tension of the spring 21 and upon a predetermined increase in the load, the spring 25 will be brought into action, the strains being taken up through the bolt 18 and top washer 22 and their adjuncts, so that the absorption and equalization of shocks is taken up by both of the springs 21 and 25, respectively. It will thus be seen that the shock absorber during its operation is subjected to an oscillating movement and also that the pull on the springs or cushioning devices is in substantially the axial line thereof.

It will now be apparent that I have devised a novel and useful shock absorber, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent is;—

1. A shock absorber, comprising a base portion, a spring abutment, a spring interposed between said spring abutment and said base portion, a bolt carried by said spring abutment, a washer slidably mounted on said bolt, a sleeve engaging said washer, a second spring interposed between said washer and the head of said bolt, and relatively movable members, one of which is connected with said base portion, and the other of which is connected with said sleeve.

2. A shock absorber, comprising a base portion pivotally supported, an abutment, a cushion intermediate said abutment and said base portion, a member movable with respect to said base portion, a connection extending from said abutment, a cushion interposed between the outer end of said connection and the end portion of said movable member, said second cushion being contained within said first cushion, and a device to be cushioned operatively connected with said movable member.

3. A shock absorber, comprising a base portion, an inner shell slidable with respect thereto and guided thereby, a washer slidable within said shell, a bolt guiding said washer and having a head within said shell, an abutment fixed to said bolt and spaced from said head, a spring between said base portion and said abutment, a spring between said washer and the head of said bolt, and means of attachment connected to said shell.

4. A shock absorber, comprising the hangers, two concentric compression springs of different capacities, a spring abutment between which and said first hanger one of said springs is interposed, a bolt having a head at one end and its opposite end fixed to said spring abutment, a member movable longitudinally with respect to said bolt and between which and the head of said bolt the other of said springs is interposed, and means to connect said member with the other of said hangers.

5. A shock absorber, comprising the hangers, two concentric compression springs of different capacities, a spring abutment between which and said first hanger one of said springs is interposed, a bolt having a head at one end and its opposite end fixed to said spring abutment, a member movable longitudinally with respect to said bolt and between which and the head of said bolt the other of said springs is interposed, an inner shell connecting said member with the second hanger, and an outer shell carried by said first hanger.

6. A shock absorber, comprising the hangers, two compression springs of different capacities concentrically arranged, a spring abutment between which and the first hanger the spring of greater capacity is interposed, a bolt having one end secured to said abutment and a head at its other end, and a washer guided by said bolt, said spring of lesser capacity being interposed between said washer and said head.

7. A shock absorber, comprising the hangers, two compression springs of different capacities concentrically arranged, an abutment between which and the first hanger the spring of greater capacity is interposed, a bolt having one end connected with said abutment and a head at its other end, a washer slidable on said bolt and between which and said head the spring of lesser capacity is interposed, and a shell operatively connecting said washer and the second hanger and inclosing said spring of lesser capacity.

WILLIAM S. MILLER.

Witnesses:
H. S. FAIRBANKS,
C. D. McVAY.